United States Patent [19]

Onishi et al.

[11] 4,389,623
[45] Jun. 21, 1983

[54] AUTOMATIC EQUALIZER ULITIZING A PREIODICALLY CONTAINED REFERENCE SIGNAL

[75] Inventors: Shunichi Onishi, Yokohama; Masaharu Obara, Tokyo; Masaru Sakurai; Junzo Murakami, both of Kawasaki; Shinichi Makino, Fujisawa, all of Japan

[73] Assignees: Tokyo Shibaura Denki Kabushiki Kaisha, Kawasaki; Nippon Hoso Kyokai, Tokyo, both of Japan

[21] Appl. No.: 264,407

[22] Filed: May 18, 1981

[30] Foreign Application Priority Data

May 28, 1980 [JP] Japan .................. 55-71018

[51] Int. Cl.³ .................. H04B 3/10; H04N 5/21
[52] U.S. Cl. .................. 333/16; 333/18; 358/905
[58] Field of Search .................. 333/16, 18, 166; 358/167, 905

[56] References Cited

U.S. PATENT DOCUMENTS 4,127,874  11/1978  Iwasawa et al. .................. 358/905 X
4,250,472  2/1981  Hashimoto .................. 333/166

OTHER PUBLICATIONS

"A Fully Automatic Ghost Canceller" by S. Makino et al., CE-24, No. 3, Aug. 1978, p. 267.
IEEE Transactions "A Digitized Automatic Ghost Canceller" by J. Murakami et al., CE-25, No. 4, Aug. 1979, p. 555.

Primary Examiner—Paul L. Gensler
Attorney, Agent, or Firm—Oblon, Fisher, Spivak, McClelland & Maier

[57] ABSTRACT

An automatic equalizer comprises a transversal filter connected to receive an input signal such as a television signal in which a predetermined periodic reference signal is present and having variable tap gains, and a correlator for forming the correlation between the input and output signals of the transversal filter and correcting the tap gains of the transversal filter to cancel out distortion components such as ghost component contained in the input signal. For the purpose of preventing the slow convergence and fluctuation of tap gains of the transversal filter due to non-periodic noise components contained in the input signal, a circuit is further provided to integrate a predetermined portion of the waveform of the reference signal contained in the input signal. An output signal of the waveform integrator circuit is correlated with the output signal of the transversal filter by the correlator.

2 Claims, 5 Drawing Figures

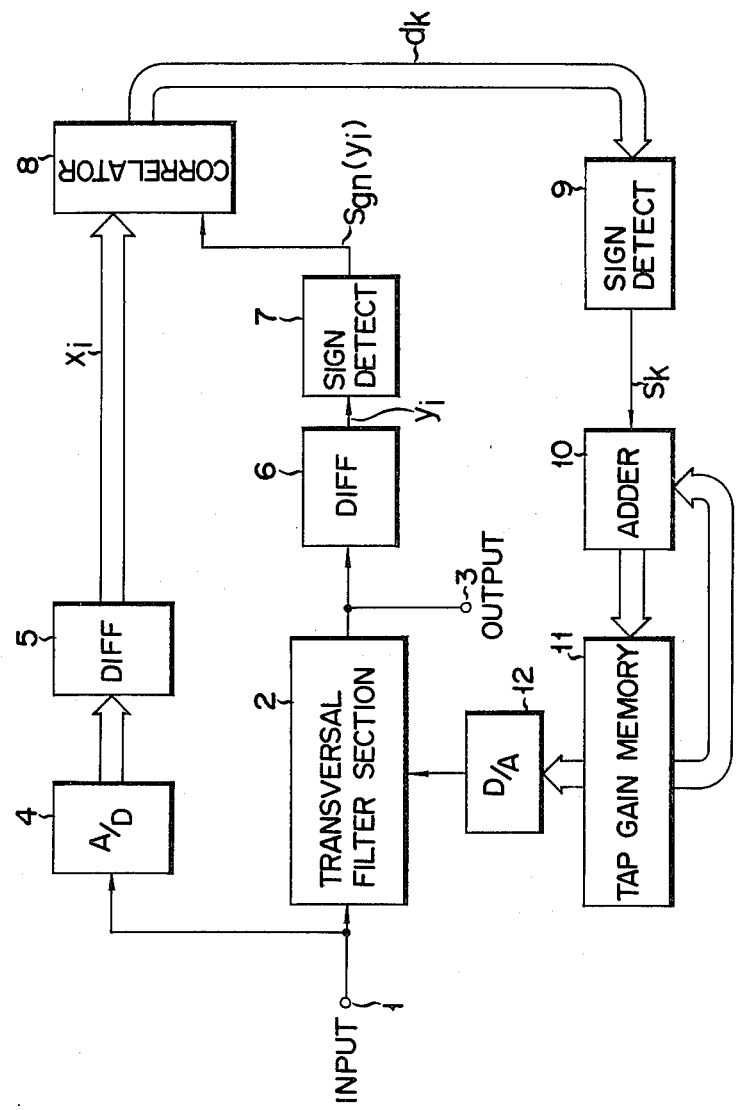
F I G. 1

AUTOMATIC EQUALIZER ULITIZING A PREIODICALLY CONTAINED REFERENCE SIGNAL

The present invention relates to an automatic equalizer for cancelling ghost components contained in a television signal and other linear distortions appearing in a signal transmission line.

A device for automatically controlling tap gains of a transversal filter to cancel out distortion components contained in a transmission signal is well known as automatic equalizer. An attention has recently been focused on the attempt to use the automatic equalizer to cancel out ghost components contained in a television signal.

In a copending U.S. Patent Application Ser. No. 158,311 filed on June 10, 1980, which issued as U.S. Pat. No. 4,303,895, assigned to the same assignee as the present invention and entitled "AUTOMATIC EQUALIZER", various automatic equalizers are disclosed which use a distortion detection circuit using analog signal processing.

When an analog distortion detection circuit or correlator is replaced by a digital detection circuit or correlator, such as ghost canceller as shown in FIG. 1 will be conceived. As shown in FIG. 1, a demodulated television signal is applied through an input terminal 1 to a transversal filter section 2, which comprises, as shown in FIGS. 2A and 2B, a tapped delay line 21 formed by a charge transfer device such as a charge coupled device (CCD), weighting circuits 22 for multiplying the tapped output signals of the delay line by tap gains as weighting coefficients, and a signal combiner 23 for combining output signals of the weighting circuits. FIG. 2A shows the transversal filter section of feedforward type in which an input signal is applied directly to the delay line 21 and an equalized output signal is taken out from the signal combiner 23, while FIG. 2B shows the transversal filter section of feedback type in which an input signal applied through the input terminal 1 and an output signal of the signal combiner 23 are added together by an adder 24 to cancel out ghost component and an output signal of the adder 24 is applied to the delay line 21. Though an output-weighted transversal filter in which each output of delay line is weighted is shown in FIGS. 2A and 2B, an input-weighted transversal filter in which an input signal is multiplied by tap gains, and then applied to stages of delay line may be employed.

The tap gains of the transversal filter section 2 depend on DC voltages applied to the weighting circuits from a tap gain memory 11 through a digital-to-analog (D/A) converter 12. Tap gains of transversal filter are corrected as follows: The television signal applied to the input terminal 1 is also applied to an A/D converter 4 and converted to digital signals. Digital output signals of A/D converter 4 are applied to a digital differentiator 5 to obtain a difference between two adjacent digital samples.

An output signal of transversal filter section 2 is applied through an output terminal 3 to utilization circuit and through an analog differentiator 6 to an analog signal sign detector 7 which comprises a voltage level comparator. The sign detector 7 detects the polarity of output signal $y_i$ of differentiator 6 to generate a voltage of a logic level 1 when the polarity is positive and a voltage of a logic level 0 when the polarity is negative.

FIG. 3A shows a trailing edge portion of the waveform of vertical synchronizing signals (reference signal) contained in television signal. When ghost component is contained therein, the synchronizing signal is followed by its ghost component, as shown in FIG. 3A. Positive ghost component is shown in FIG. 3A. FIG. 3B shows a waveform of output signal of the analog differentiator 6. The digital differentiator 5 is adapted to detect the change of a predetermined waveform portion A in which the trailing edge of synchronizing signal is included.

The output signals of the digital differentiator 5 and analog sign detector 7 are applied to a digital correlator 8, which comprises multipliers and an accumulator. An output signal of the analog sign detector 7 having logic level 1 is processed as a digital value of +1 and the one having logic level 0 is processed as a digital value of −1 in the digital correlator.

Providing that the output signal of the digital differentiator 5 be represented by $X_i$ and output of the analog sign detector 7 which stands for the sign of output signal yi of the analog differentiator 6 by sgn ($y_i$), the output of the digital correlator 8 will be expressed as follows:

$$d_k = \sum_{i=1}^{n} X_i \cdot sgn(y_{i+k}) \quad (1)$$

wherein i=1, 2, 3, ..., n (the number of samples in the portion A) and k=1, 2, 3, ..., N (the number of taps of transversal filter). This correlation signal $d_k$ is applied to a digital sign detector 9, which produces sign data $S_k$ of +1 or −1 depending upon the sign of $d_k$.

Sign data $S_k$ is added through the adder 10 to the least significant bit (LSB) of numerical value data corresponding to a tap gain $C_k$ in the tap gain memory 11.

When it is assumed that a positive ghost is present at a position corresponding to the delay time of kth tap among N taps, the sign data $S_k$ becomes −1 and the tap gain $C_k$ successively increases by a predetermined amount every field scanning period of the T.V. system, e.g., every vertical synchronization pulse. And when $C_k$ is converged on a value necessary to cancel ghost, the change of tap gain $C_k$ terminates.

Namely, providing that $C_k$ obtained after the corrections are made M times is represented by $C_k^M$, it will be expressed as follows after the corrections are made (M+1) times:

$$C_k^{M+1} = C_k^M - \alpha \cdot sgn(d_k) \quad (2)$$

where $\alpha$ is a positive constant.

Accordingly, when ghost is cancelled out and thus $y_i$ converges on zero, $S_k$ takes a value of +1 or −1 in the equal probability due to the effect of noise components because $d_k$ becomes about zero. $C_k$ converges, at this time, on the value necessary to cancel ghost.

When noise components contained in television signal applied to the input terminal 1 are extremely large in the above-mentioned device, the correlation signal $d_k$ generated by the correlator 8 also contains large noise components. Under this condition the convergence of tap gains will be delayed and tap gains fluctuate greatly after their convergence. The fluctuation of tap gains, particularly, adversely affects the stability of device and the quality of reproduced pictures.

The object of the present invention is to provide an automatic equalizer arranged to reduce the effect of noise components contained in an input signal applied to a transversal filter on the convergence of tap gains of transversal filter to thereby make faster the convergence of tap gains and achieve stable operation of the device.

This object can be attained by the provision of a circuit connected to receive an input signal in which a predetermined periodic reference signal is contained for integrating a predetermined portion of the waveform of reference signal every time when the reference signal appears, an output signal of the circuit being correlated by a correlator with an output signal of the transversal filter.

Due to the waveform integration circuit only periodic reference signal components are allowed to be extracted and nonperiodic noise components are suppressed, so that the S/N ratio of output signal of the correlator can be improved to make faster the convergence of tap gains of transversal filter and prevent the fluctuation of tap gains.

This invention can be more fully understood from the following detailed description when taken in conjunction with the accompanying drawings, in which:

FIG. 1 is a block diagram of an example of automatic equalizer.

FIG. 4 shows an automatic equalizer embodying the present invention, which is same as the one shown in FIG. 1 except that the A/D converter 4 is displaced by a waveform integration circuit 30. The same parts as those shown in FIG. 1 are designated by the same reference numerals and description thereof is omitted.

Figure 2A:
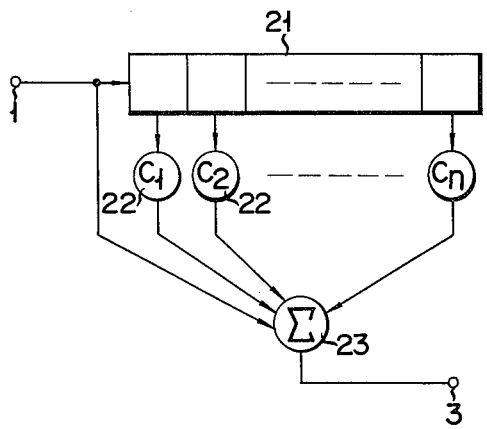
FIGS. 2A and 2B show transversal filter sections which may be employed in the automatic equalizer.
Figure 2B:
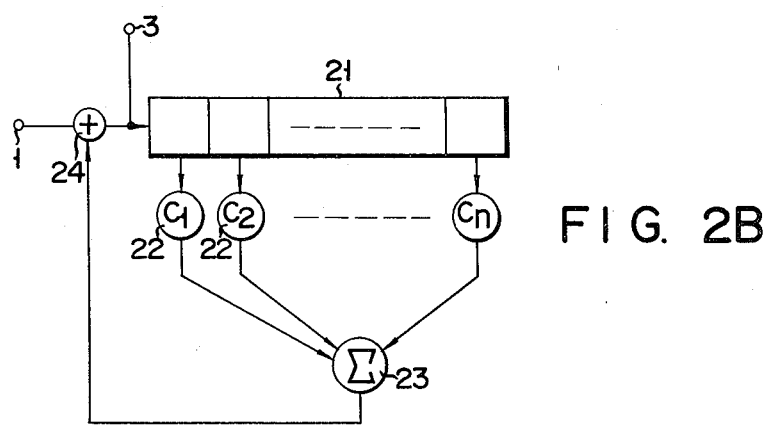
Figure 3:
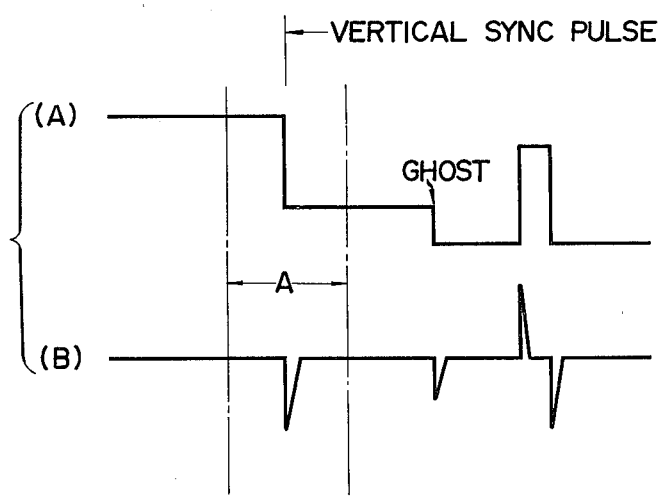
FIG. 3 shows a waveform to explain the operation of automatic equalizer shown in FIG. 1.
Figure 4:
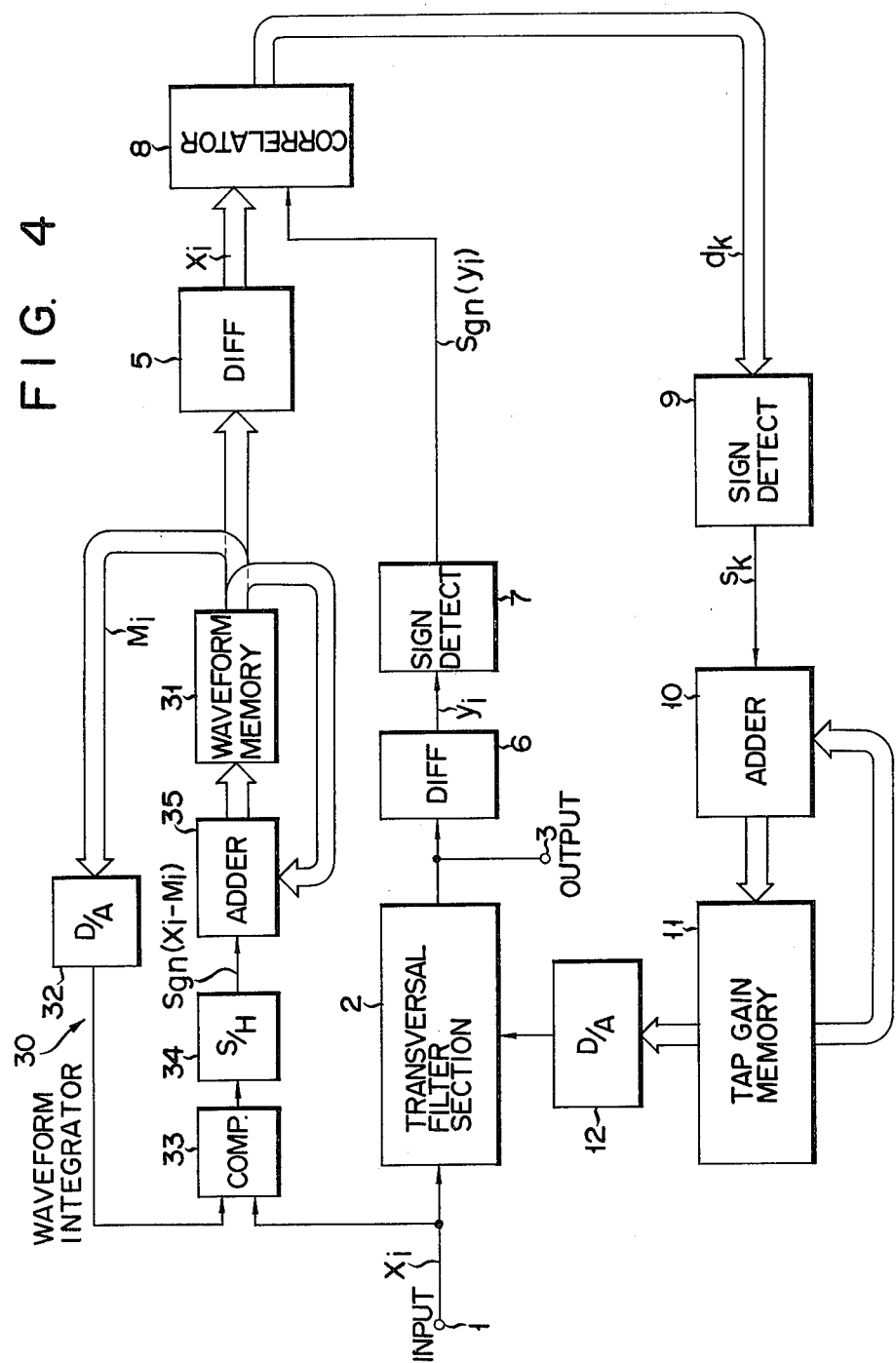
FIG. 4 is a block diagram of an automatic equalizer embodying the present invention.

A waveform memory 31 of the waveform integration circuit 30 stores, in the form of digital values of n samples, a predetermined portion of reference signal waveform, for example, the portion A of vertical synchronizing signal shown in FIG. 3A in which the negative transition of vertical synchronizing signal is included. N digital words stored in the waveform memory 31 are serialy read out to be applied to the digital differentiator 5 and a digital-to-analog (D/A) converter 32. An analog output signal of the D/A converter 32 is compared by a level comparator 33 with an input television signal to be applied to the transversal filter section 2. The comparator 33 generates a first voltage level corresponding to the digital value of +1 when the output signal of D/A converter 32 is smaller than the television signal and a second voltage level corresponding to the digital value of −1 when the former is larger than the latter. Output voltage of comparator 33 is sampled by a sample and hold (S/H) circuit 34 and then applied to an adder 35. The first and second voltage levels generated by the comparator 33 are treated as digital values of +1 and −1 in the adder 35 and added to the LSB of the corresponding sample data read out of the waveform memory 31. The result of addition is written into the waveform memory 31.

Providing that data in the waveform memory 31 be represented by $M_i$ and the sample value of television signal applied to the input terminal 1 by $X_i$, the corrected value $M_i'$ of $M_i$ will be obtained as follows:

$$M_i' = M_i + \frac{1}{2^m} \cdot sgn(X_i - M_i) \quad (3)$$

where i represents, as in the case of equation (1), integers ranging from 1 to n, and m the bit number of a data sample in the waveform memory 31. When the operation of correction is carried out every time the vertical synchronizing signal appears, $M_i$ is finally converged on $X_i$ with accuracy of $\frac{1}{2}^m$. When $M_i$ becomes equal to $X_i$, the comparator 33 generates a voltage level of +1 or −1 in the same probability due to noise components contained in the television signal $X_i$.

The value of $M_i$ at the time of convergence is substantially equal to the value gained by adding and averaging $X_i$ $2^m$ times or the one gained by waveform integration. Therefore, noise components contained in television signal $X_i$ can be cancelled.

Data read out from the waveform memory 31, that is, waveform integration output is applied through the digital differentiator 5 to the correlator 8 where it is correlated with the output signal of sign detector 7 to generate the correlation signal $d_k$, which is supplied, as in the case shown in FIG. 1, via the sign detector 9 and adder 10 to the tap gain memory 11 to correct the tap gains of transversal filter.

As apparent from the above, the signal-to-noise (S/N) ratio of input signal $X_i$ of correlator 8 is enhanced because noise components are cancelled by the waveform integration circuit 30, and the S/N ratio of correlation signal $d_k$ is also therefore enhanced. As the result, the convergence of tap gains of transversal filter is made faster with the fluctuation thereof reduced, thus allowing stable operation to be achieved.

In addition, the embodiment of the present invention makes it unnecessary to include the A/D converter therein and can be made therefore simpler in construction than the automatic equalizer shown in FIG. 1. Namely, the automatic equalizer shown in FIG. 1 needs the A/D converter 4 to supply waveform information of the reference signal in the input television signal applied to the transversal filter section 2 to the correlator 8. Since the input signal is television signal, the A/D converter 4 must have a performance of eight-bit accuracy at the sampling rate of over 10 MHz. However, the A/D converter of such high performance causes a problem in cost and size when it is to be employed in the television receiver.

In contrast, the embodiment of the present invention needs the waveform memory 31, D/A converter 32, comparator 33, S/H circuit 34 and adder 35 instead of A/D converter 4, but these circuits are much more advantageous as a whole than the A/D converter.

It should be understood that the present invention is not limited to the embodiment shown and described above. As the correction algorithm of tap gains, for example, proportional control of the following equation as well as incremental control of equation (2) may be employed.

$$C_k^{M+1} = C_k^M - \alpha \cdot d_k \quad (4)$$

Correlation signal $d_k$ can be obtained by other various equations except equation (1). Generally speaking, correlation can be obtained using the input signal $X_k$ of transversal filter and an error signal $e_k$ which represents the difference between the output signal $y_k$ of transversal filter and a reference signal $r_k$, and the embodiment of present invention corresponds to the case where the reference signal $r_k$ is excluded.

Correlation signal $d_k$ can be displaced by values obtained from the following equations:

$$d_k = \sum_{i=1}^{n} X_i \cdot e_{i+k} \tag{5}$$

$$d_k = \sum_{i=1}^{n} sgn(X_i) \cdot e_{i+k} \tag{6}$$

$$d_k = \sum_{i=1}^{n} X_i \cdot sgn(e_{i+k}) \tag{7}$$

$$d_k = \sum_{i=1}^{n} sgn(X_i) \cdot sgn(e_{i+k}) \tag{8}$$

The embodiment of the present invention uses vertical synchronizing signal as the reference signal to detect ghost, but a pulse signal for detecting ghost may be previously contained in a television signal. This case makes it unnecessary to differentiate signal because the reference signal is pulse-formed as shown in FIG. 3B, and the digital differentiator 5, analog differentiator 6 and sign detector 7 can be excluded so as to supply output signals of waveform integrator 30 and transversal filter 2 directly to the correlator 8.

What we claim is:

1. An automatic equalizer comprising:
   a transversal filter connected to receive an input signal in which a predetermined reference signal is periodically contained and having variable tap gains;
   a waveform integrator circuit means connected to receive the input signal for integrating the waveform of the reference signal;
   a correlator means responsive to the output of said transversal filter and waveform integrator circuit means; and
   a circuit means responsive to said correlator means to correct the tap gains of said transversal filter.

2. An automatic equalizer according to claim 1 wherein said waveform integrator circuit means includes a waveform memory for digitally storing the waveform of a predetermined portion of the reference signal in the input signal, a digital-to-analog converter connected to the output of said waveform memory, a level comparator connected to receive the input signal and the output signal of said digital-to-analog converter, and a means responsive to the output of said level comparator to correct the digital values stored in said waveform memory.

* * * * *

UNITED STATES PATENT AND TRADEMARK OFFICE
CERTIFICATE OF CORRECTION

PATENT NO. : 4,389,623

DATED : June 21, 1983

INVENTOR(S) : Shunichi Onishi et al

It is certified that error appears in the above-identified patent and that said Letters Patent is hereby corrected as shown below:

On the title page, Item [54] should read:

--[54] AUTOMATIC EQUALIZER UTILIZING A PERIODICALLY CONTAINED REFERENCE SIGNAL --

Signed and Sealed this

Thirteenth Day of September 1983

[SEAL]

Attest:

GERALD J. MOSSINGHOFF

Attesting Officer

Commissioner of Patents and Trademarks